United States Patent
Tona et al.

(10) Patent No.: US 12,448,942 B2
(45) Date of Patent: Oct. 21, 2025

(54) METHOD FOR PREDICTING A CHARACTERISTIC RESULTING FROM A SWELL ON THE BASIS OF A SPECTRAL MODEL OF THE SWELL

(71) Applicant: IFP Energies nouvelles, Rueil-Malmaison (FR)

(72) Inventors: Paolino Tona, Rueil-Malmaison (FR); Alexis Merigaud, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 497 days.

(21) Appl. No.: 17/801,558

(22) PCT Filed: Mar. 1, 2021

(86) PCT No.: PCT/EP2021/055029
§ 371 (c)(1),
(2) Date: Aug. 23, 2022

(87) PCT Pub. No.: WO2021/180502
PCT Pub. Date: Sep. 16, 2021

(65) Prior Publication Data
US 2023/0167796 A1 Jun. 1, 2023

(30) Foreign Application Priority Data
Mar. 11, 2020 (FR) ........................... 2002422

(51) Int. Cl.
*F03B 3/14* (2006.01)
*F03B 13/14* (2006.01)

(52) U.S. Cl.
CPC .......... *F03B 13/14* (2013.01); *F05B 2240/95* (2013.01); *F05B 2260/821* (2013.01); *F05B 2260/84* (2013.01); *F05B 2270/404* (2013.01)

(58) Field of Classification Search
None
See application file for complete search history.

(56) References Cited

U.S. PATENT DOCUMENTS 9,945,349 B2 * 4/2018 Allen ..................... F03B 13/189
12,061,083 B2 * 8/2024 Previsic .................. F03B 13/14
(Continued)

FOREIGN PATENT DOCUMENTS

FR 2876751 A1 4/2006
FR 2973448 A1 10/2012
(Continued)

OTHER PUBLICATIONS

European Search Report and Opinion for PCT/EP2021/055029, dated Mar. 1, 2021, 7 pages.
(Continued)

*Primary Examiner* — Kayla Mccaffrey
(74) *Attorney, Agent, or Firm* — Fitch, Even, Tabin & Flannery LLP

(57) ABSTRACT

The present invention is a method for predicting a swell-resulting characteristic for a floating system. The method updates (MAJ) a spectral model (MSH) of the swell to form a swell prediction model (MPR). This model is applied to real-time measurements (MES) to predict the swell-resulting characteristic (pred).

25 Claims, 6 Drawing Sheets

(56) References Cited

U.S. PATENT DOCUMENTS

| | | | |
|---|---|---|---|
| 2009/0146429 A1 | 6/2009 | Protter et al. | |
| 2010/0230370 A1 | 9/2010 | Schneider et al. | |
| 2017/0298899 A1 | 10/2017 | Abdelkhalik et al. | |

FOREIGN PATENT DOCUMENTS

| | | |
|---|---|---|
| FR | 3042889 A1 | 4/2017 |
| WO | 2009/081042 A1 | 7/2009 |
| WO | 2017/071946 A1 | 5/2017 |

OTHER PUBLICATIONS

Halliday, J. Ross et al; "An Application of the Fast Fourier Transform to the Short-Term Prediction of Sea Wave Behaviour"; Renewable Energy, vol. 36, No. 6, (Jun. 1, 2011), pp. 1685-1692, XP055715812; 8 pages.

Brask, Annette Kristin; "Control and Estimation of Wave Energy Converters"; Norwegian University of Science and Technology, Dept. of Marine Technology, (Jun. 27, 2015), 117 pages.

Fusco, F, et al; "Short-Term Wave Forecasting for Real-Time Control of Wave Energy Converters"; IEEE Transactions on Sustainable Energy vol. 1, Issue 2 (2010), pp. 99-106.

Shook, D.S., et al; "Identification For Long-Range Predictive Control"; IEE Proceedings D (Control Theory and Applications), vol. 138. 1. IET. 1991, pp. 75-84.

Fischer, B., et al.; "Online-Algorithm Using Adaptive Filters For Short-Term Wave Predication and its Implementation", Proceedings of the 4th International Conference on Ocean Energy (ICOE), Dublin, Ireland, 2012, pp. 17-19.

* cited by examiner

[Fig 1]
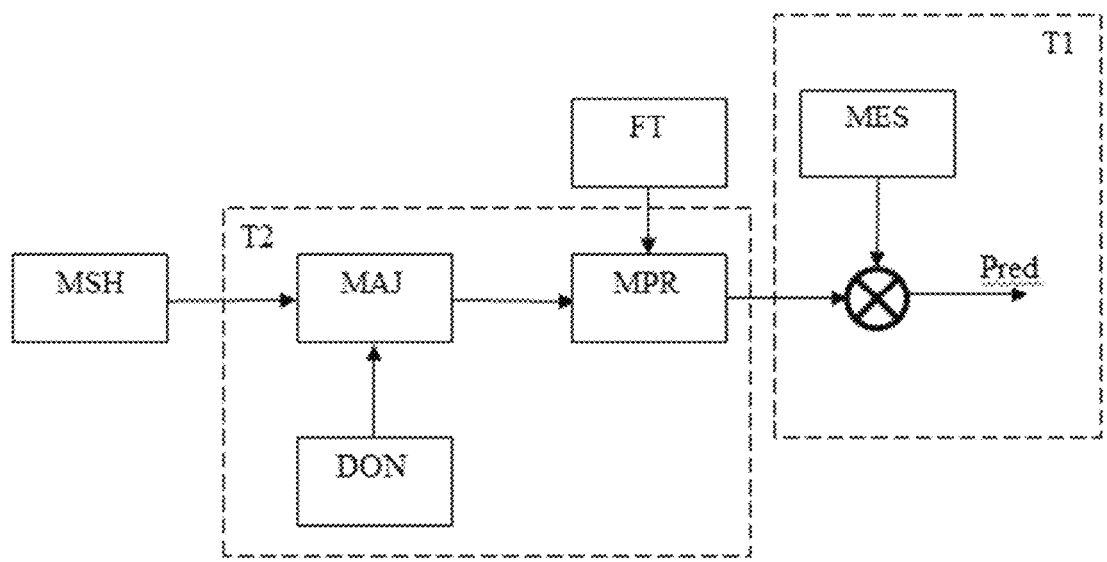
[Fig 2]
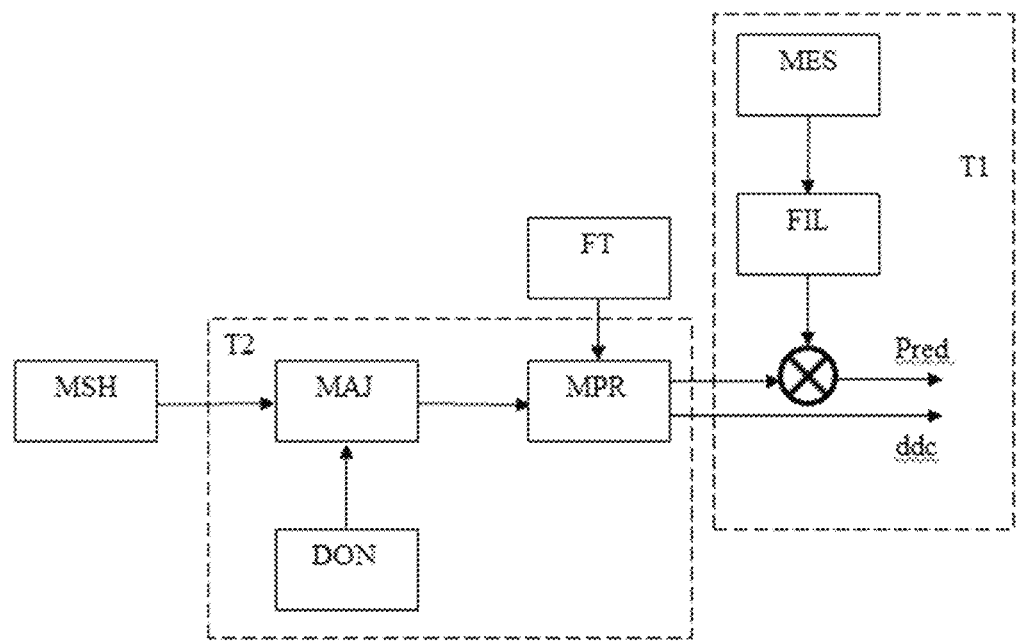

[Fig 3]
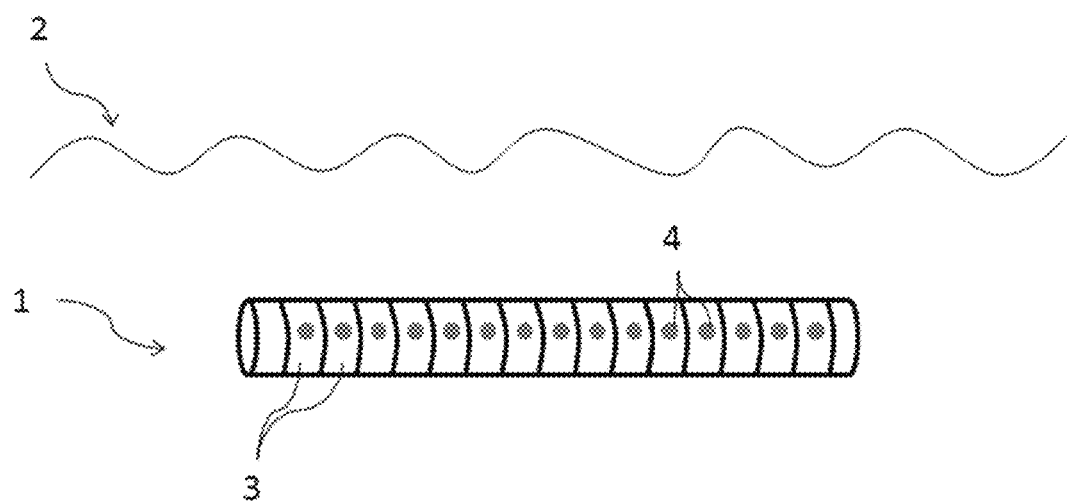
[Fig 4]
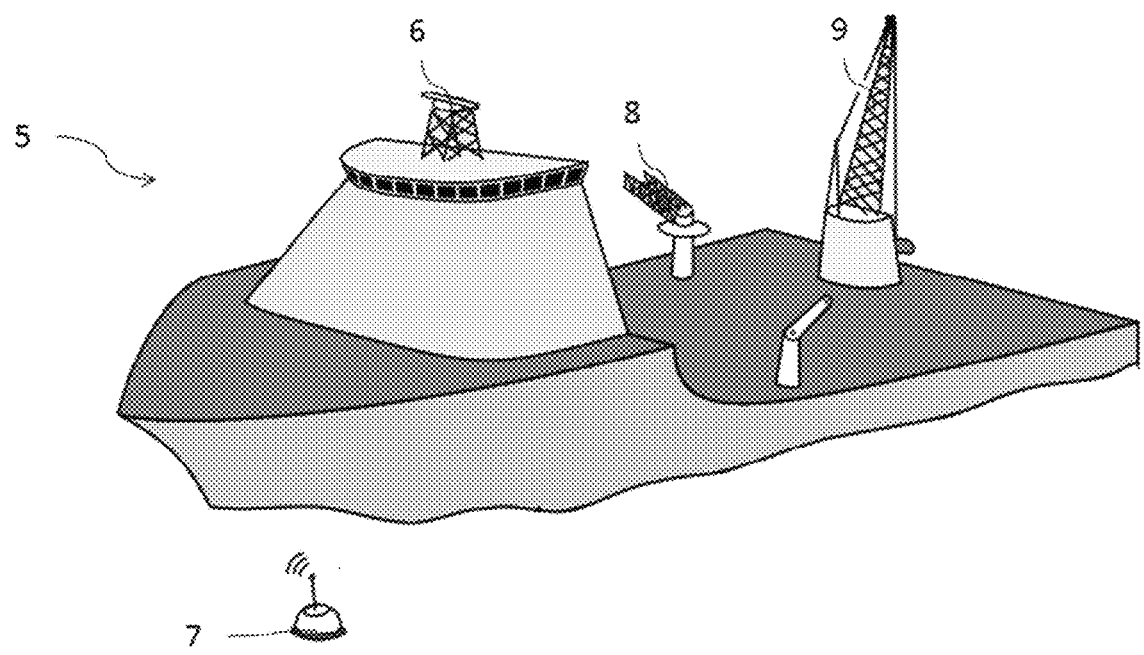

[Fig 5]
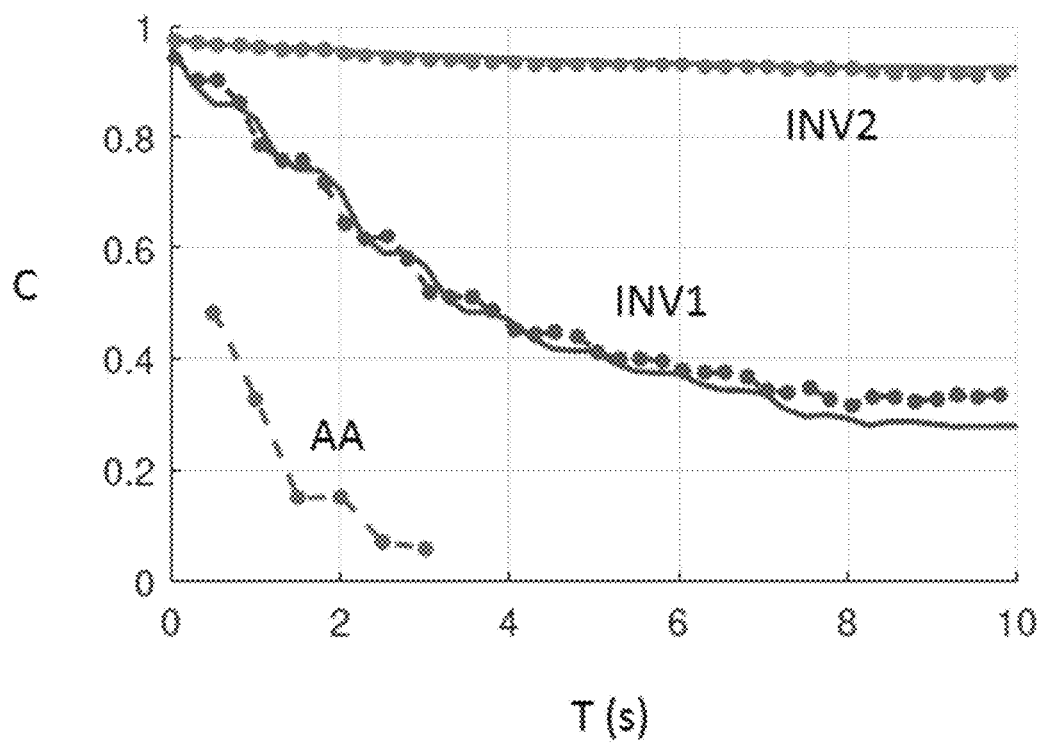

[Fig 6]
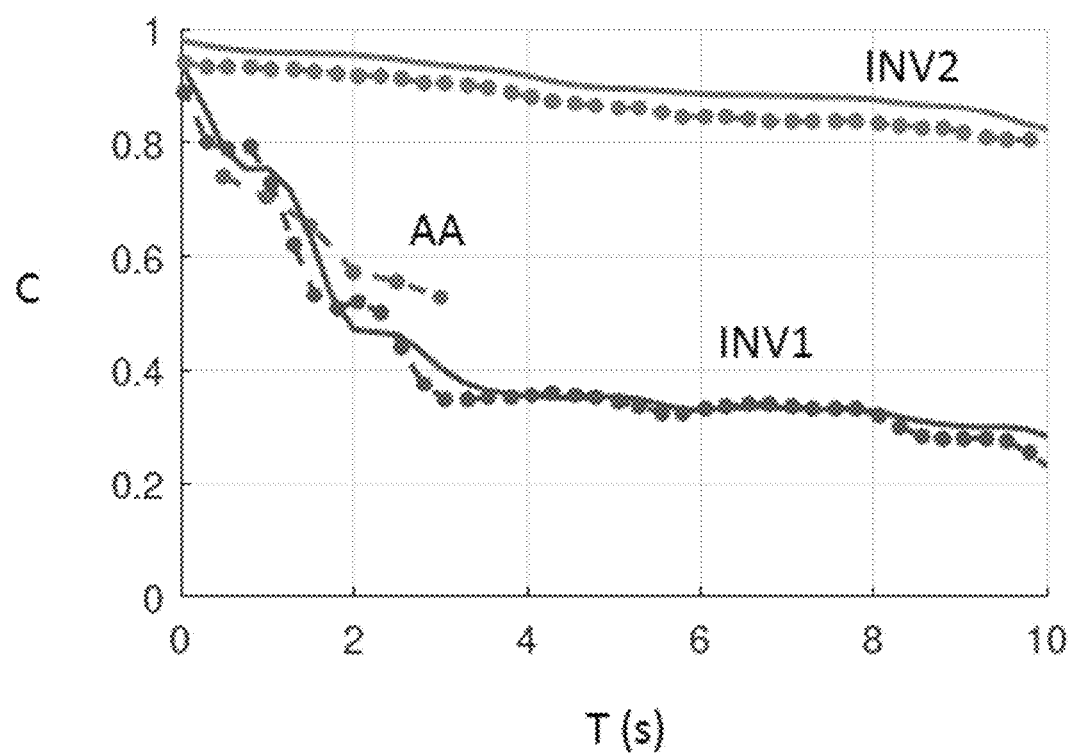

[Fig 7]
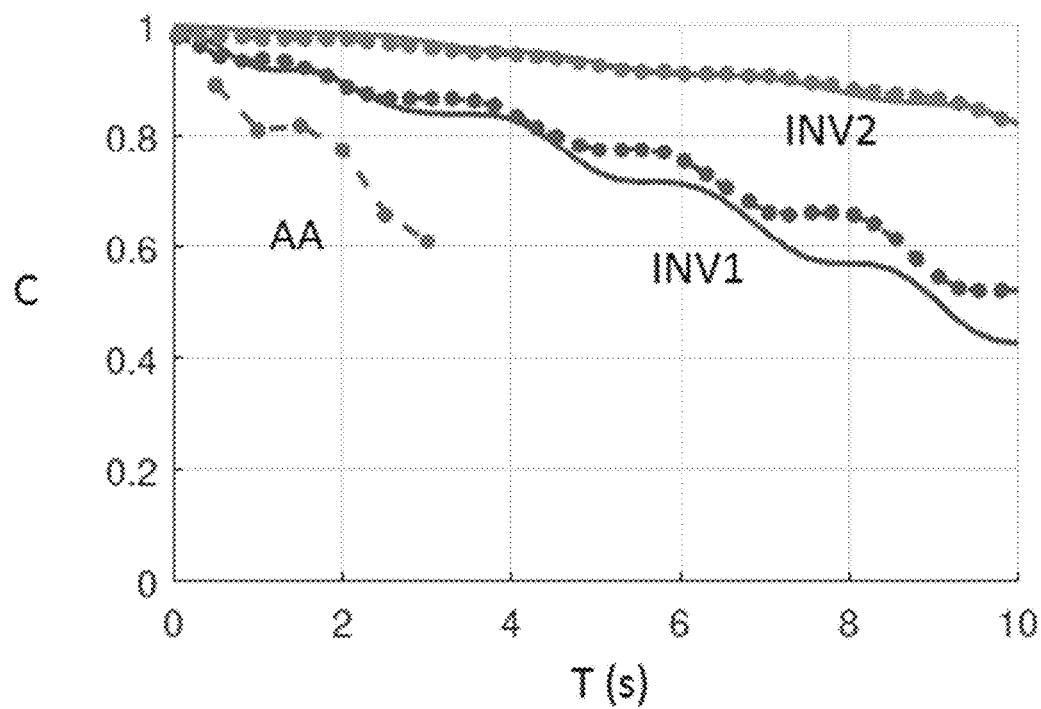

METHOD FOR PREDICTING A CHARACTERISTIC RESULTING FROM A SWELL ON THE BASIS OF A SPECTRAL MODEL OF THE SWELL

CROSS-REFERENCE TO RELATED APPLICATIONS

Reference is made to International Application No. PCT/EP2021/055029, filed Mar. 1, 2021, which claims priority to French Patent Application No. 20/02.422, filed Mar. 11, 2020, the contents of which are incorporated herein by reference in their entirety.

BACKGROUND OF THE INVENTION

Field of the Invention

The present invention relates to the field of swell prediction, in particular for controlling a wave-energy converter.

Description of the Prior Art

For a few years now, sources of renewable energy have seen a substantial amount of interest. The fact that these energy sources are clean, free and inexhaustible is a major advantage in a world beset by the inexorable decrease in available fossil fuels and increasingly conscious of the need to preserve the planet. Among these energy sources, wave energy, which is relatively unknown compared to widely publicized technologies such as wind or solar, has a role to play in the essential diversification of the exploitation of renewable energies. Wave-energy-harvesting devices, commonly referred to as "wave-energy converters", are particularly interesting, having as they do the potential to generate 300 to 400 GW along European coasts, without emitting any greenhouse gases. They are particularly suitable for delivering electricity to isolated insular sites.

For example, patent applications FR 2876751, FR 2973448 and WO 2009/081042 describe apparatuses for capturing the energy produced by tidal flow. These devices are composed of a floating holder on which a pendulum is placed that is mounted so as to be movable with respect to the floating holder. The relative movement of the pendulum with respect to the floating holder is used to produce electric energy by use of a power take-off (for example an electrical machine). The power take-off works both as a generator and as a motor. Specifically, to provide torque or force to drive the pendulum, power is delivered to the power take-off in order to make the pendulum resonate with the waves (motor mode). In contrast, to produce a torque or force which resists the movement of the pendulum, power is harvested via the power take-off (generator mode).

A certain number of algorithms, allowing short-term swell (wave) force or elevation to be predicted based on time series of past measurements have been proposed in the literature. Among these, the following are known: the harmonic-decomposition approach (implemented via Kalman filter or using a recursive-least-squares algorithm), the sinusoidal-extrapolation approach (implemented via extended Kalman filter) and the autoregressive (AR) model approach with prediction error minimized for one time increment or more than one time increment (in the latter case reference is made to long-range predictive identification or LRPI). Such approaches are described in the following documents:

Francesco Fusco and John V Ringwood, Short-term Wave Forecasting for Real-time Control of Wave Energy Converters, IEEE Transactions on Sustainable Energy Vol 1, Issue 2 (2010), pp. 99-106; and D. S. Shook, C. Mohtadi, and S. L. Shah, Identification for Long-Range Predictive Control, IEE Proceedings D (Control Theory and Applications), Vol. 138. 1. IET. 1991, pp. 75-84.

Furthermore, the following document:

B Fischer, P Kracht, and S Perez-Becker, Online-Algorithm Using Adaptive Filters for Short-term Wave Prediction and its Implementation, Proceedings of the 4th International Conference on Ocean Energy (ICOE), Dublin, Ireland, 2012, pp. 17-19, describes a number of predictor variants based on AR models, and more particularly a bank of filters having a plurality of AR-model-based predictors in which the coefficients are adapted via a recursive-least-squares algorithm.

Another autoregressive-model variant is detailed in patent application FR 3042889 (WO 2017/071946), which relates to a method for predicting swell (force, elevation, etc.) in the short term, on the basis of a time series of past swell measurements. This variant assumes an unstationary context, but with slow sea-state changes. It is based on updating, by use of an adaptive Kalman filter, the coefficients of an AR model allowing a multi-increment minimization of the prediction error (i.e. minimization to a horizon several time increments in the future). However, this method does not allow measurements of different nature (generated by sensors of the behavior of the system itself, or by sensors of the wave field) to be combined because it is based on a single time series. In addition, this method, like all the aforementioned methods, does not allow accurate predictions to be made beyond half a swell period when the signal-to-noise ratio is low or when non-linear effects are present (and in any case certainly not beyond one swell period).

SUMMARY OF THE INVENTION

With the intention of improving the efficiency and therefore the profitability of devices for converting wave energy into electrical energy (wave-energy converters), it is advantageous to control the power take-off in real time, in order to maximize the energy absorbed by the system. This requires the behavior of the swell (wave), whether it be a question of the elevation of its free surface or of the force exerted on the wave-energy converter, to be predicted in real time.

In other fields in which floating systems are employed (floating platform, floating wind turbine, vessel, etc.), it is advantageous to predict the behavior of the swell (wave), in order to ensure the stability of these floating systems or to optimize their use.

For example, one possible application is dynamic vessel positioning (heave compensation or the control of robotic arms on board vessels). Other types of applications may benefit from prediction, multiple tens of seconds in advance, of periods of calm (e.g. landing helicopters, recovery of small submersibles or surface boats, and various crew transshipment and vessel-to-vessel transfer operations, all of which require a relatively short time window during which the motion due to the swell is sufficiently small). The ability to predict these periods of calm, if only a few tens of seconds in advance, could significantly extend the sea conditions under which these operations could be carried out.

Another example of application relates to floating wind turbines. Specifically, the angle of orientation of the blades of these wind turbines may be controlled in real time, not only with a view to maximizing harvested power and regulating the speed of the rotor (which are the "conventional" reasons why wind-turbine blades are controlled), but also to reduce pitching or the mechanical forces induced by the swell. To achieve the last two objectives, application of predictive control is an interesting avenue, which requires the action of the swell (wave) on the floating object to be predicted.

The present invention reliably and accurately predicts a swell-resulting characteristic (wave-resulting characteristic) to a future horizon in real time, taking into account the variability of the sea state. To achieve this goal, the present invention relates to a method for predicting a swell-resulting characteristic (wave-resulting characteristic) of a floating system, the method updating a spectral model of the swell (wave) to form a swell prediction model which is applied to real-time measurements with a view to predicting the swell-resulting characteristic (wave-resulting characteristic). Updating the spectral model of the swell (wave) allows a better representativeness of the swell (wave) and therefore a better prediction to be achieved.

The invention relates to a method for predicting a characteristic resulting from the sea's swell for a floating system subjected to the swell, the floating system being provided with at least one sensor that measures the variation in the swell, the method for predicting the characteristic resulting from the swell implementing a transfer function that relates the characteristic resulting from the swell to a measurement of the at least one sensor. In this method, the following steps are implemented:
  a) the variation in the swell is measured in real time with a first time interval by use of the at least one sensor;
  b) a spectral model of the swell is updated with a second time interval, the spectral model of the swell being updated on the basis of meteorological data and/or on the basis of at least one measurement of the at least one sensor, and the second time interval being longer than the first time interval;
  c) a swell prediction model is determined by use of the transfer function and of the updated spectral model of the swell; and
  d) the characteristic resulting from the swell is determined, in real time, for a future period, by use of the swell prediction model applied to the real-time measurements.

According to one embodiment, the floating system is a wave-energy converter, which converts the energy of the swell into electrical, pneumatic or hydraulic energy, a vessel, a floating platform, a floating wind turbine, an amphibious vehicle or a seaplane.

According to one implementation, the at least one sensor is a sensor chosen from: a radar, a lidar sensor, a sensor of deformation of at least one deformable portion of the floating system, a sensor of movement of at least one mobile portion of the floating system, an accelerometer placed on at least one mobile portion of the floating system, and a sensor of pressure within at least one pneumatic or hydraulic portion of the floating system.

Advantageously, the first time interval is comprised between 0.01 s and 10 min.

Advantageously, the second time interval is comprised between 10 min and 24 h.

According to one aspect, the method for predicting the swell-resulting characteristic comprises a prior step of constructing the transfer function.

According to one feature, the method for predicting the swell-resulting characteristic further comprises a step of filtering the measurements of the at least one sensor.

According to one embodiment, the method for predicting the swell-resulting characteristic further comprises a step of determining a degree of confidence in the prediction of the swell-resulting characteristic by use of the swell prediction model.

According to one implementation, the characteristic resulting from the swell is the elevation of the swell, at least one point of and the value of the signal of the at least one sensor.

According to one option of an embodiment, the floating system is equipped with sensors, and the variation in the swell, is measured by each sensor.

According to one variant, for a future period, the future value of the signal of each sensor is determined by taking into account only the measurements of the sensor in question.

Alternatively, for a future period, the future value of the signal of each sensor is determined by taking into account the measurements of all the sensors.

According to one embodiment, the prediction model is determined using a prediction approach based on the spectrum of the swell.

The invention further relates to a method for controlling a wave-energy converter, which converts the energy of the swell into electrical, pneumatic or hydraulic energy, wherein a characteristic resulting from the effect of the swell on the wave-energy converter is predicted by use of the method for predicting a resulting characteristic according to one of the above features, and the wave-energy converter is controlled depending on the predicted characteristic resulting from the swell.

Other features and advantages of the method according to the invention will become apparent on reading the following description of non-limiting exemplary embodiments, with reference to the appended figures described below.

BRIEF DESCRIPTION OF THE DRAWINGS

FIG. 1 illustrates the steps of the method for predicting a swell characteristic according to one embodiment of the invention.

FIG. 2 illustrates the steps of the method for predicting a swell characteristic according to a second embodiment of the invention.

FIG. 3 illustrates a wave-energy converter for implementing the method according to one embodiment of the invention.

FIG. 4 illustrates a vessel for implementing the method according to one embodiment of the invention.

FIG. 5 illustrates the correlation between measured and predicted values as a function of the prediction horizon, for a swell spectrum with a peak period of 2 s, the prediction being obtained using a method according to the prior art, and using two variant embodiments of the method according to the invention, respectively.

FIG. 6 illustrates the correlation between measured and predicted values as a function of the prediction horizon, for a swell spectrum with a peak period of 3 s, the prediction being obtained using a method according to the prior art, and using two variant embodiments of the method according to the invention, respectively.

FIG. 7 illustrates the correlation between measured and predicted values as a function of the prediction horizon, for a swell spectrum with a peak period of 4 s, the prediction being obtained using a method according to the prior art, and using two variant embodiments of the method according to the invention, respectively.

DETAILED DESCRIPTION OF THE INVENTION

Figure 8:
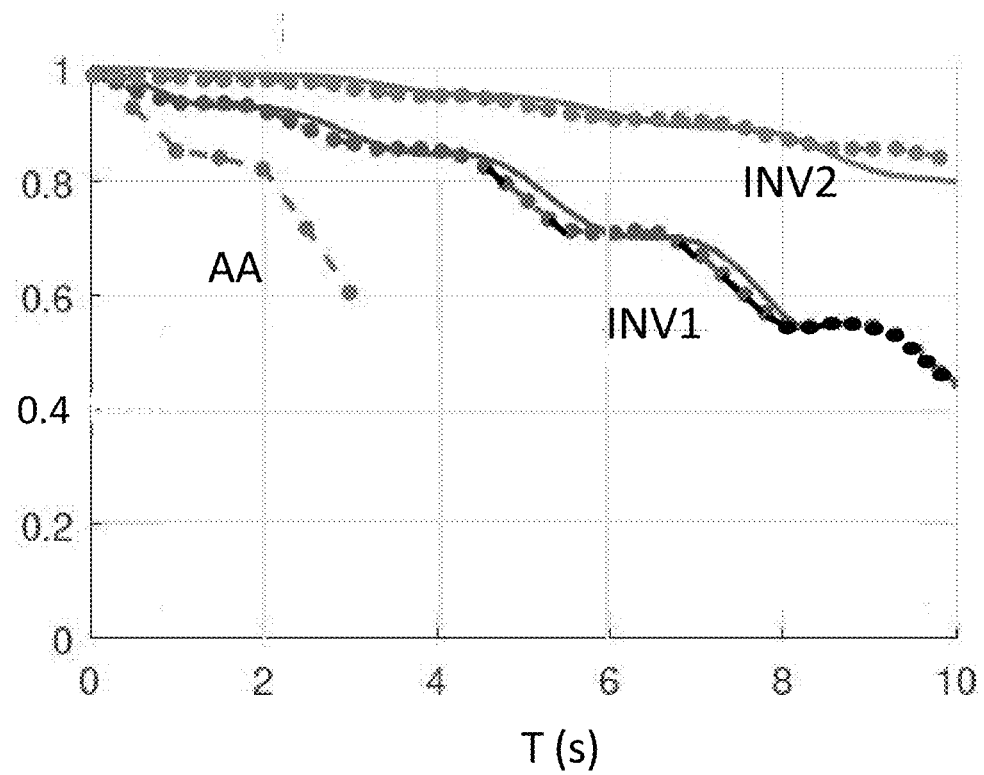
FIG. 8 illustrates the correlation between measured and predicted values as a function of the prediction horizon, for a swell spectrum with a peak period of 5 s, with the prediction being obtained using a method according to the prior art, and using two variant embodiments of the method according to the invention, respectively.

The present invention relates to a method for predicting a characteristic resulting from the effect of the sea's swell (wave) on a floating system subjected to the movement of the swell (wave). The predicted resulting characteristic may in particular be the force exerted by the swell (wave) on the floating system, the elevation of the swell (wave) in the location of the floating system or in a location close to the floating system, the movement of the floating system, the value of a signal of a sensor (i.e. the measurement of a sensor), or any analogous characteristic, etc.

The floating system may be a wave-energy converter (of any envisionable form), a floating platform (for example a platform used in the petroleum industry), or an (offshore) floating wind turbine, a vessel, an amphibious vehicle, a seaplane, or any analogous floating system. In the remainder of the description, the predicting method is described, non-limitingly, in the context of a wave-energy converter. This wave-energy converter converts the energy of the swell (wave) into electrical, pneumatic or hydraulic energy. According to one design, the wave-energy converter may comprise a mobile device connected to an electrical, pneumatic or hydraulic machine, which harvests energy and controls the wave-energy converter. However, all the described embodiments are suitable for any floating or oscillating system.

The method according to the invention is a predictive method, because it allows the swell-resulting characteristic for a future horizon, to be determined. This future horizon may advantageously be comprised between 1 s and 5 min.

In the remainder of the description the terms waves, tides and swell are considered to be equivalent.

According to the invention, the floating system is equipped with at least one sensor that measures the variation in the swell or a characteristic resulting from the swell. In other words, the sensor is able to measure a parameter related to the swell, for example the elevation of the surface of the sea, a force related to the swell, the movement of the floating system, etc. Such a sensor may in particular be chosen from:

A radar, which provides an image of the elevation of the surface of the sea in a region surrounding the floating system. Such a sensor may in particular be used when the floating system is a vessel or a floating platform;

A sensor of deformation of at least one deformable portion of the floating system. For example, it may be a question of a sensor placed on a deformable wall of a flexible wave-energy converter in which the conversion of energy is distributed along the wall (and carried out through the very deformation of the wall) or localized at a specific location in the wave-energy converter (and carried out via a power take-off);

A LIDAR sensor (LiDAR or lidar standing for light detection and ranging) capable of providing an image of the elevation of the surface of the sea in a region surrounding the floating system;

An optical stereo-camera sensor, capable of providing an image of the elevation of the surface of the sea in a region surrounding the floating system;

A sensor of movement of a mobile portion of the floating system, for example, in the case of a wave-energy converter with a mobile portion that oscillates with the swell;

A sensor of pressure within at least one mobile portion of the floating system. It may for example be a question of a sensor of pressure within a pneumatic energy-converting system of a wave-energy converter;

An acceleration sensor, capable of detecting one or more modifications in at least one of the three-dimensional inclination and elevation of the floating system, this elevation or inclination being due to the swell, and Wireless communication capable of communication with buoys equipped with swell-elevation sensors, etc.

FIG. 3 illustrates, schematically and non-limitingly, a wave-energy converter for implementation of the method for predicting a swell characteristic according to one embodiment of the invention. The wave-energy converter 1 is located below the sea's surface 2 or on the sea's surface (embodiment not shown). The wave-energy converter 1 is composed of flexible rings 3 hinged to each other, which form a flexible tube. The swell-related deformations generate energy by use of electroactive polymers or piezoelectric materials. Furthermore, the wave-energy converter 1 comprises deformation sensors 4. Non-limitingly, a deformation sensor 4 may measure the electrical signals generated by the electroactive polymers of the rings 3.

FIG. 4 illustrates, schematically and non-limitingly, a vessel 5 for implementing the method for predicting a swell characteristic according to one embodiment of the invention. The vessel 5 is equipped with a radar 6 for measuring the elevation of the sea in a region surrounding the vessel 5. In addition, the vessel 5 is equipped with wireless communications (not shown) which communicate with the buoy 7, that is equipped with a swell-elevation sensor. The method according to the invention allows use of lifting devices which are cranes 8 and 9 provided on the vessel 5 to be optimized, for example by accounting for future moments of cessation of the swell or by adapting the lift lengths to the swell predicted in real time.

Moreover, the method according to the invention implements a transfer function that relates the incident swell to measured and predicted swell-resulting characteristics. If the floating system comprises multiple of sensors, then the method according to the invention employs one transfer function per sensor. The transfer function expresses the relationship between the input incident swell, and the output sensor measurement. In other words, the transfer function may be considered to be a dynamic model that relates the input incident swell to the output sensor measurement. According to one embodiment of the invention, the transfer function may be known initially. Alternatively, the transfer function may be obtained in a prior step of identifying the model of the floating system and of the sensor.

According to one embodiment of the invention, for a rigid (non-deformable) floating system, for example for the vessel of FIG. 4, the transfer function may depend only on the frequency and on the angular direction of the incident swell. Such a transfer function H may be written: $H(\omega, \theta)$ with $\omega$ frequency, and $\theta$ angular direction.

As a variant, for a flexible (deformable) floating system, for example for the wave-energy converter illustrated in FIG. 3, the transfer function may further depend on additional real coordinates. Such a transfer function H may be written H(χ,ω,θ) with χ being additional real coordinates, w being frequency, and θ being angular direction. For example, for the wave-energy converter illustrated in FIG. 3, x designates position along the wave-energy converter.

According to the invention, the method for predicting the swell-resulting characteristic comprises the following steps:
  measuring in real time
  updating a spectral model of the swell
  determining a swell prediction model
  predicting the swell-resulting characteristic.

These steps will be described in detail in the remainder of the description. The steps of updating a spectral model of the swell, of determining a prediction model, and of predicting may be implemented by computer, and in particular by a calculator or computer provided on the floating system, or in wireless communication with the floating system. The steps of measuring in real time and of predicting the swell-resulting characteristic are implemented in real time with a relatively short first time interval (i.e. at a relatively high first frequency), the time interval typically being from 0.01 s to 1 min. The steps of updating the spectral model of the swell and of determining a swell prediction model are implemented with a second time interval (i.e. at a second frequency), the second time interval is longer than the first time interval (the second frequency is lower than the first frequency), and typically from 10 min to 24 h, and preferably from 10 min to 6 h.

The method according to the invention implements what is referred to as an SPB approach (SPB standing for spectrum-based predictor), in this case the spectrum being the spectrum of the swell. Such an approach is based on the assumption that the physical variables form a stationary Gaussian process, this being a standard assumption in oceanography and marine engineering. Under this assumption, it is possible to determine a statistically optimal predictor, using the spectral model of the swell, and using transfer functions characterizing the observed and predicted variables.

In practice, it is possible to implement the steps with two different time intervals, since the swell spectrum, and therefore the optimal predictor, may be considered stationary to a horizon of a few tens of minutes. Thus, it is not necessary to update the spectral model of the swell in real time at a high frequency. By virtue of the implementation of the steps on different time scales, it is possible to limit the number of computations to be performed with the first time interval which allows the swell characteristic to be predicted with a low computation time, compatible with the first time interval.

Preferably, the first time interval may be comprised between 0.01 s and 10 min. This time interval may for example be equal to 1 s. These values allow swell to be predicted in real time.

Preferably, the second time interval may be comprised between 10 min and 24 h, and preferably between 10 min and 6 h. This time interval may for example be equal to 1 h. These values make it possible to limit the frequency at which the spectral model is updated while keeping the spectral model satisfactorily representative of the swell, and therefore the reliability of prediction of the swell-resulting characteristic satisfactory.

FIG. 1 illustrates, schematically and non-limitingly, the steps of the predicting method according to one embodiment of the invention. The predicting method comprises a step MES of measuring in real time with a time interval T1 of the variation in the swell by use of at least one sensor. In this method, a spectral model MSH of the swell is further employed, which is updated MAJ with a time interval T2, on the basis of data DON, which may be meteorological data or data measured by at least one sensor. The time interval T2 is longer than the time interval T1. The method also employs a transfer function FT that relates the incident swell to the measurements of the one or more sensors in question, with a view to determining, with a time interval T2, a swell prediction model MPR. Next, this swell prediction model MPR is applied to the measurements MES with a time interval T1 in order to deduce therefrom the prediction Pred of the swell-resulting characteristic for a future period (for a future horizon).

According to one embodiment of the invention, the method for predicting a swell-resulting characteristic may further comprise a step of filtering the measurements. Filtering makes it possible in particular to reduce noise, to reduce measurement disparities between any sensors, etc. It may in particular be a question of FFT filtering (FFT standing for fast Fourier transform), spatial filtering of the data using, for example, polynomial functions such as Chebyshev polynomials, or any analogous filter.

In accordance with one implementation of the invention, the method for predicting a swell-resulting characteristic may further comprise a step for determining a degree of confidence in the prediction. This degree of confidence may be determined by use of the swell prediction model, with time interval T2. This step makes it possible to characterize the mean squared error for each predicted variable and each prediction horizon.

FIG. 2 illustrates, schematically and non-limitingly, the steps of the predicting method according to a second embodiment of the invention. The second embodiment of the invention comprises the two optional steps (filtering, degrees of confidence) described above. These two steps are independent. As a variant, the method according to the invention may comprise only one of these steps. The predicting method comprises a step MES of measuring in real time with a time interval T1 the variation in the swell by at least one sensor. This measuring step MES is followed by a step FIL of filtering the measurements. In this method, a spectral model MSH of the swell is further employed, which is updated MAJ with a time interval T2, on the basis of data DON, which may be meteorological data or data measured by at least one sensor. The time interval T2 is longer than the time interval T1. The method also employs a transfer function FT that relates the incident swell to the measurements of the one or more sensors in question, with a view to determining, in real time and with a time interval T2, a swell prediction model MPR and a degree of confidence ddc in the prediction of the swell-resulting characteristic. Next, this swell prediction model MPR is applied to the measurements MES with a time interval T1, in order to deduce therefrom the prediction Pred of the swell-resulting characteristic for a future period (for a future horizon).

1) Measuring in Real Time

In this step, the variation in the swell is measured in real time with a first time interval of at least one sensor. Thus, at least one variation in the swell is obtained in real time with a measurement frequency that is high (with respect to the frequency of update of the spectral model of the swell).

According to one embodiment of the invention, the measurements may be stored in memory, in particular in the computer, and for example in a memory of a computer or calculator. Thus, the prediction may take into account past measurements allowing a more accurate prediction of the swell-resulting characteristic.

2) Filtering the Measurement

In this optional step, the measurements are filtered. Filtering makes it possible in particular to reduce noise and to reduce any measurement disparities between sensors, etc. It may in particular be a question of FFT filtering (FFT standing for fast Fourier transform), spatial filtering of the data using, for example, polynomial functions such as Chebyshev polynomials, or any analogous filter.

This step may also be implemented by computing a computer or calculator.

3) Updating a Spectral Model of the Swell

In this step, a spectral model of the swell is updated with a second time interval (longer than the first time interval). The spectral model of the swell is updated on the basis of at least one of the meteorological models and on the basis of at least one measurement of at least one sensor, in particular a sensor used for step 1). Thus, spectral model of the swell makes possible accounting for the variability in the state of the sea.

The spectral model of the swell is a power spectral density (PSD). By definition, the power spectral density is the square of the modulus of the Fourier transform divided by the width of the spectral band, itself equal to the inverse of the integration time. This spectral model characterizes the properties of swell as a random process. It is not a question of modes of oscillation as in a harmonic decomposition (which represents a deterministic system with a finite number of oscillatory modes), nor of an identification of a dominant frequency. The document: Athanasios Papoulis and S. Unnikrishna Pillai, Probability, Random Variables, and Stochastic Processes, Tata McGraw-Hill Education, 2002, is about random processes and their spectral representation.

This stochastic representation of the swell makes possible combining measured signals, by considering them to conjointly form a multi-dimensional random process. It is in this way that the method according to the invention makes it possible to process and combine at least two time series or at least two measurement points (for example the many observation points of a radar, or indeed of a plurality of different sensors, etc.) instead of a single time series, as is sometimes the case in the prior art.

The spectral model of the swell assumes that the swell is a zero-mean Gaussian process. Such an assumption is justified under most measurement conditions, excepting major storms, or in very shallow water. Therefore, application of such an assumption makes the prediction of the swell-resulting characteristic reliable. In addition, the wave field is considered, during the second time interval, to be stationary in which the statistical properties of the wave field are considered to not largely vary. Given the Gaussian-process assumption, the stationarity assumption may be reduced to the stationarity of the mean and of the auto-covariance function. Furthermore, the wave field may be considered to be uniform in the studied region ("in space" in light of the stationarity assumption). Thus, the covariance of the elevation of the free surface of the sea measured at two different positions depends only on the relative position of these two points. The swell field may be considered uniform over distances of a few kilometers. Under these assumptions, the sea's state is fully characterized by the elevation spectrum of the free surface n which spectrum depends on frequency and on angular direction in the horizontal plane, and may therefore be written:

$S_{\eta\eta}(\omega,\theta)$ where $\omega$ is frequency, and $\theta$ is angular direction. When the spectral model of the swell is updated, it is $S_{\eta\eta}$ that is updated. $S_{\eta\eta}$ may be provided directly by weather-forecasting agencies such as the ECMWF (https://www.ecmwf.int/en/forecasts), or estimated from local measurements made by at least one sensor, for example a sensor used for step 1.

4) Determining a Swell Prediction Model

In this step, a swell prediction model is determined by the transfer function and of the updated spectral model of the swell. The prediction model relates the measurements generated by one or more sensors to a prediction of a swell-resulting characteristic. Because the spectral model of the swell is updated with a second time interval, the swell prediction model is determined with the second time interval. In other words, the swell prediction model remains valid for the duration of the second time interval.

The swell prediction model may depend on one or more sensors. With fewer sensors, the swell prediction model is simpler and requires less complex computations which facilitates its real-time implementation. With more sensors, the prediction may be more accurate.

Thus, the invention exploits the mathematical relationship between, on the one hand, the power spectral density, and, on the other hand, the statistical correlation between the various measured quantities, between the various predicted quantities, and between the measured and predicted quantities, according to the following schema: DSP-correlations-predictor.

According to one non-limiting exemplary embodiment, this step may be implemented by the operations described below.

First, the spectrum and cross-spectrum of all the observed and predicted variables are determined. Let $y_1$ be the signal of a sensor used for the prediction or the swell-resulting characteristic that it is being sought to predict. Let $y_2$ be the signal of a sensor used for the prediction, or the swell-resulting characteristic that it is being sought to predict. Under the stationary-Gaussian-swell assumptions, $y_1$ and $y_2$ are random zero-mean stationary Gaussian processes. The cross-spectrum of $y_1$ and $y_2$ is computed which is based on the spectral model of the swell and on the transfer functions $H_{\eta y_1}$ and $H_{\eta y_2}$ as relates the free-surface elevation to the variables $y_1$ and $y_2$, respectively, as follows:

$$S_{y_1 y_2}(\omega) = \int_{\theta=0}^{2\pi} H_{\eta y_1}(\omega, \theta) S_{\eta\eta}(\omega, \theta) H_{\eta y_2}^*(\omega, \theta) d\theta$$

with $\eta$ being the free-surface elevation, $S_{y_1 y_2}(\omega)$ being the cross-spectrum of signals $y_1$ and $y_2$ ($y_1$ and $y_2$ possibly designate the same signal), $S_{\eta\eta}$ being the spectrum of the swell, $\omega$ being frequency, $\theta$ being angular direction, H being the transfer function, and H* being its conjugate. This calculation is performed for each possible signal pair, that is each possible pair among the sensors used for the prediction and the swell-resulting characteristic.

Next, the Wiener-Khinchin theorem may be applied to determine the covariance function of each pair of signals $y_1$ and $y_2$:

$$\begin{cases} S_{zz}(\omega) = \int_{-\infty}^{\infty} r_{zz}(\tau) e^{-i\omega t} d\tau \\ r_{zz}(\omega) = \frac{1}{2\pi} \int_{-\infty}^{\infty} S_{zz}(\omega) e^{i\omega t} d\omega \end{cases}$$

$$r_{y_1 y_2}(\tau) = \frac{1}{2\pi} \int_{-\infty}^{\infty} S_{y_1 y_2}(\omega) e^{i\omega t} d\omega$$

with τ being one time interval, $S_{y_1y_2}(\omega)$ being the cross-spectrum, $r_{y_1y_2}$ being the variance-covariance function, and z being a signal (z may be $y_1$ or $y_2$).

In the remainder of the description, the index o refers to observed signals and the index p refers to predicted signals.

By virtue of this step, matrices $r_{oo}(\tau)$, $r_{op}(\tau)$ and $r_{pp}(\tau)$ may be constructed: element (i, j) of the matrix $r_{oo}(\tau)$ is the covariance function of the i-th and j-th observed signals; element (i, j) of the matrix $r_{op}(\tau)$ is the covariance function of the i-th observed signal and the j-th predicted signal (swell-resulting characteristic); lastly, element (i, j) of the matrix $r_{pp}(\tau)$ is the covariance function of the i-th and j-th predicted signals (swell-resulting characteristics).

The observed (measured) values form a random vector Zo(t), and the values that it is desired to predict form a random vector Zp(t). These two vectors are conjointly zero-mean Gaussian and entirely characterized by their covariance matrices, which are denoted Σoo, Σpp and $\Sigma_{op} = \Sigma_{po}^T$.

Let $$T_o = (\underline{T}_o \underline{T}_o + \Delta t \ \ldots \ \overline{T}_o)^T \in \mathbb{R}^{N_o} \text{ and } T_p = (\underline{T}_p \underline{T}_p + \Delta t \ \ldots \ \overline{T}_p)^T \in \mathbb{R}^{N_p}$$

be the set of observation and prediction times with respect to the present time t. A vector $$Z_o(t) = \begin{pmatrix} z_o(t - \underline{\tau}_o) \\ \vdots \\ z_o(t - \overline{\tau}_o) \end{pmatrix}$$

is defined that contains the data observed (measured) at all the past time increments that it is desired to take into account for the prediction, and a vector $$Z_p(t) = \begin{pmatrix} z_p(t - \underline{\tau}_p) \\ z_p(t - \overline{\tau}_p) \end{pmatrix}$$

is defined that contains the data that it is sought to predict, to all the prediction horizons. Concretely, the prediction model must determine how to best compute $Z_p(t)$ on the basis of $Z_o(t)$.

Because stationarity is assumed, the covariance matrices corresponding to Zo(t) and Zp(t) do not depend on t. In addition, they are block Toeplitz, and may be structured in the following way:

$$\Sigma_{oo} = \begin{pmatrix} A_{1,1} & \ldots & A_{1,N_o} \\ \vdots & \ddots & \vdots \\ A_{N_o,1} & \ldots & A_{N_o,N_o} \end{pmatrix} \in \mathbb{R}^{M_oN_o \times M_oN_o}$$

$$\Sigma_{pp} = \begin{pmatrix} B_{1,1} & \ldots & B_{1,N_p} \\ \vdots & \ddots & \vdots \\ B_{N_p,1} & \ldots & B_{N_p,N_p} \end{pmatrix} \in \mathbb{R}^{M_pN_p \times M_pN_p}$$

$$\Sigma_{op} = \begin{pmatrix} C_{1,1} & \ldots & C_{1,N_p} \\ \vdots & \ddots & \vdots \\ C_{N_o,1} & \ldots & C_{N_o,N_p} \end{pmatrix} \in \mathbb{R}^{M_oN_o \times M_pN_p}$$

$$\Sigma_{po} = \Sigma_{op}^T$$

with blocks A, B, C defined by:

$$\begin{cases} A_{i,j} = r_{oo}(\tau_o(j) - \tau_o(i)), \ \forall \ (i, j) \in [1 \ \ldots \ N_o]^2 \\ B_{i,j} = r_{pp}(\tau_p(j) - \tau_p(i)), \ \forall \ (i, j) \in [1 \ \ldots \ N_p]^2 \\ C_{i,j} = r_{op}(\tau_p(j) - \tau_o(i)), \ \forall \ (i, j) \in [1 \ \ldots \ N_o] \times [1 \ \ldots \ N_p] \end{cases}$$

Because stationary Gaussian signals have been assumed, the best predictor relating $Z_p(t)$ at $Z_o(t)$ is a linear operation on the components of $Z_o(t)$, as detailed in step 6. This linear operation is performed by virtue of a matrix P, which may be obtained via the equation:

$$P = \sum_{po} \sum_{oo}^{\dagger}$$

In this equation, the "dagger" exponent designates the matrix inverse (if the matrix is invertible) or pseudo-inverse (if the matrix is not invertible this indicates that the invention contained in Zo(t) is statistically redundant). It will be noted that all the operations leading to the calculation of the prediction matrix P may be performed with a time interval T2, because they depend only on the spectral model of the swell and on the transfer functions.

These operations may be adapted to the assumptions in question, and may also be adapted to the transfer function for a flexible floating system, in particular by taking into account additional data.

5) Determining Degree of Confidence

In this optional step, a degree of confidence in the prediction of the swell-resulting characteristic may be determined. This degree of confidence may be determined by use of the swell prediction model. This step makes possible characterizing error. Because the spectral model of the swell is updated with a second time interval, the degree of confidence is determined with the second time interval. In other words, the degree of confidence remains valid for the duration of the second time interval.

This step may also be implemented by computing devices (computer or calculator).

According to one non-limiting example of implementation of this step, the degree of confidence may be determined on the basis of the covariance matrix $\Sigma_{p|o}$ of the prediction error, which may be computed in the following way:

$$\Sigma_{p|o} = \Sigma_{pp} - \Sigma_{po} \Sigma_{oo}^{\dagger} \Sigma_{op}$$

In this equation, the "dagger" exponent designates the matrix inverse (if the matrix is invertible) or pseudo-inverse (if the matrix is not invertible this indicates that the invention contained in $Z_o(t)$ is statistically redundant). The matrix $\Sigma_{p|o}$ contains the values of the mean squared error for each pair of prediction horizons and each pair of predicted signals (swell-resulting characteristics).

6) Predicting the Swell-Resulting Characteristic

In this step, the swell-resulting characteristic is predicted, in real time, for a future horizon (for a future period) by applying the swell prediction model determined in step 4) to the measurements carried out in step 1), and optionally filtered in step 2). Thus, for a future horizon, the swell-resulting characteristic is obtained on the basis of a reliable model and of measurements. Therefore, the prediction of the swell-resulting characteristic is reliable.

This step is implemented with the first time interval (i.e. for each new measurement), the prediction model remaining identical during the second time interval. Thus, the same prediction model is used for a number of predictions.

For this step, the following equation may be employed:

$$\tilde{Z}_p(t) = PZ_o(t)$$

with P being the prediction model determined in step 4), $Z_o(t)$ being the measured values, and $\tilde{Z}_p(t)$ being the predicted values of the resulting characteristic.

Furthermore, the invention relates to a method for controlling a wave-energy converter, which converts wave energy into electric, pneumatic or hydraulic energy. The control method comprises a step of predicting the swell according to one of the variants or combinations of variants described above, with at least the following steps:

1) Measuring in real time;
2) Updating a spectral model of the swell;
3) Determining a swell prediction model; and
4) Predicting the swell-resulting characteristic.

The control method according to the invention also comprises a step of controlling the wave-energy converter depending on the characteristic (force, elevation, etc.) of the swell, so as to optimize the harvest of energy. This control may control the mobile device of the wave-energy converter, for example by an electrical, pneumatic or hydraulic power take-off (PTO). This PTO influences the movement of the mobile device and allows mechanical energy to be transferred to the electrical, pneumatic or hydraulic network. Model predictive control (MPC) is one example of a method for controlling wave-energy converters requiring real-time wave prediction. The control method according to the invention may also be applied to a wave-energy converter belonging to the category of wave-energy converters employing oscillating water columns (OWCs), or to any other type of wave-energy converter.

The control method according to the invention is particularly suitable for a wave-energy converter such as described with reference to FIG. 3. Specifically, such a system is equipped with a high number of sensors. In addition, the method according to the invention allows charging and discharging of electro-active polymers or of piezoelectric materials to be properly synchronized.

Specifically, the control method according to the invention allows optimal control, because the predicting method according to the invention provides a method for predicting the force, or elevation, that the swell will exert on the mobile device to a future horizon, on the basis of values measured in the past and on the basis of a spectral wave model.

In addition, the present invention relates to a method for controlling landing or transfer of at least one of device on and from a vessel or a floating platform. In this method, the following steps may be carried out:

a swell-resulting characteristic is predicted for the vessel or floating platform by use of the predicting method according to any one of the variant embodiments described above;

a future time at which the swell-resulting characteristic will vary little is determined on the basis of the prediction of the swell-resulting characteristic; and landing or transfer is performed at the time determined in the preceding step.

The present invention also relates to a method for controlling a floating wind turbine, in which method the following steps are carried out:

a swell-resulting characteristic is predicted for the floating wind turbine by use of the predicting method according to any one of the variant embodiments described above;

the action of the swell on the float of the floating wind turbine is deduced therefrom; and the floating wind turbine is controlled (in particular the angle of inclination of its blades are controlled) so as to reduce the stresses on the structure of the wind turbine, depending on the prediction of the action of the swell on the float.

EXAMPLE

Features and advantages of the method according to the invention will become more clearly apparent on reading about the following example of application.

In this example, a wave-energy converter such as illustrated in FIG. 3 was employed. The wave-energy converter was a flexible floating tube of 30 m length and of 1.2 m diameter, which was aligned with the main direction of the swell. The pressure wave created by the passage of the swell caused a radial deformation of the tube, and this deformation was converted into electricity by virtue of rings of electroactive polymers or of piezoelectric materials placed along the tube. The electric signals of the rings of electroactive polymers or piezoelectric materials were recorded and served as a deformation sensor for the purposes of the prediction. In addition, swell probes were placed along the tube in order to measure the elevation of the free surface.

Four experiments were carried out with different swell spectra, corresponding to four different sea states, with periods ranging from 2 to 5 s.

The transfer functions of each sensor were constructed on the basis of some of the measurement signals of the sensors.

Subsequently, a characteristic of the swell was determined for a horizon of 10 seconds:

by use of the prior-art method described in the patent application FR 3042889 (WO 2017/071946). This embodiment is designated by the reference AA, by use of a first variant embodiment of the invention, in which the swell prediction model depends solely on the sensor in question. This embodiment is designated by the reference INV1, by use of a second variant embodiment of the invention, in which the swell prediction model depends on the measurements of all the sensors. This embodiment is designated by the reference INV2.

FIGS. 5 to 8 illustrate the correlation curves C of these three embodiments, as a function of the future time horizon T in s. The correlation expresses the reliability of the measurement: the closer the correlation is to 1, the better the prediction. FIGS. 5 to 8 regard the prediction for a sensor located towards the downstream end of the tube in the direction of propagation of the swell. In these figures, theoretical predictions have been represented by solid lines, and experimental predictions have been represented by broken lines. FIG. 5 corresponds to swell with a period of 2 s; FIG. 6 corresponds to swell with a period of 3 s; FIG. 7 corresponds to swell with a period of 4 s and FIG. 8 corresponds to swell with a period of 5 s.

It will be noted that, in these figures, the method according to the invention (INV1 and INV2) allows better correlation than the prior-art method. The second variant embodiment of the invention (INV2) has a better correlation than the first variant embodiment (INV1).

The results are similar for other sensors placed in other positions on the tube. Therefore, the method according to the invention allows an accurate prediction of a characteristic of the swell.

The invention claimed is:

1. A method for predicting a characteristic of an incident water swell on a floating system by using at least one sensor located on the floating system which measures variation in the incident swell or a characteristic resulting from the incident swell, and a transfer function expressing a relationship between the incident water swell and measurements provided by the at least one sensor, comprising:
   a) measuring with the at least one sensor a parameter of the incident water swell in real time during a first time interval;
   b) providing a spectral model of the incident water swell and updating the spectral model of the incident water swell in a second time interval subsequent to the first time interval which is longer than the first time interval by using at least one of meteorological data and at least one measurement from the at least one sensor;
   c) constructing a water swell prediction model by using the transfer function and the updated spectral model of the water swell; and
   d) predicting the characteristic of the incident water swell in real time for a future horizon by using the water swell prediction model applied to real-time measurements.

2. The method for predicting the characteristic recited in claim 1, wherein the floating system comprises a wave-energy converter for converting energy of water swells into electrical, pneumatic or hydraulic energy acting on a vessel, a floating platform, a floating wind turbine, an amphibious vehicle or a plane.

3. The method for predicting the characteristic recited in claim 2, wherein the at least one sensor is chosen from one of a radar, lidar, a sensor of deformation of at least one deformable portion of the floating system, a sensor of movement of at least one mobile portion of the floating system, an accelerometer placed on at least one mobile portion of the floating system, a pressure sensor within at least one of a pneumatic or a hydraulic portion of the floating system.

4. The method for predicting the characteristic recited in claim 3, wherein the second time interval is between 10 min and 24 h.

5. The method for predicting the characteristic recited in claim 2, wherein the second time interval is between 10 min and 24 h.

6. The method for predicting the characteristic recited in claim 5, wherein predicting the characteristic comprises filtering the measurements of the at least one sensor.

7. The method for predicting the characteristic recited in claim 3, wherein predicting the characteristic comprises filtering the measurements of the at least one sensor.

8. The method for predicting the characteristic recited in claim 2, wherein predicting the characteristic comprises filtering the measurements of the at least one sensor.

9. The method for predicting the characteristic of the incident future water swell recited in claim 1, wherein the at least one sensor is chosen from one of radar, lidar, a sensor which senses deformation of at least one deformable portion of the floating system, a sensor of movement of at least one mobile portion of the floating system, an accelerometer placed on at least one mobile portion of the floating system, a pressure sensor within at least one of a pneumatic or a hydraulic portion of the floating system.

10. The method for predicting the characteristic recited in claim 9, wherein the second time interval comprises between 10 min and 24 h.

11. The method for predicting the characteristic recited in claim 10, wherein predicting the characteristic comprises filtering the measurements of the at least one sensor.

12. The method for predicting the characteristic recited in claim 9, wherein predicting the characteristic comprises filtering the measurements of the at least one sensor.

13. The method for predicting the characteristic recited in claim 1, wherein the first time interval comprises between 0.01 s and 10 min.

14. The method for predicting obtaining the characteristic recited in claim 13, wherein predicting the characteristic comprises filtering the measurements of the at least one sensor.

15. The method for predicting the characteristic recited in claim 1, wherein the second time interval is between 10 min and 24 h.

16. The method for predicting the characteristic recited in claim 15, wherein predicting the characteristic comprises filtering the measurements of the at least one sensor.

17. The method for predicting the characteristic recited in claim 1, comprising constructing the transfer function before predicting a characteristic of the incident water swell.

18. The method for predicting the characteristic recited in claim 1, wherein predicting the characteristic comprises filtering the measurements of the at least one sensor.

19. The method of predicting the characteristic recited in claim 1, comprising determining a degree of confidence in the water swell prediction model.

20. The method for predicting the characteristic recited in claim 1, wherein the characteristic is elevation for at least one location on the incident water swell measured by at least one sensor.

21. The method for predicting the characteristic recited in claim 1, wherein the floating system has sensors which each measure variation of the floating system.

22. The method for predicting the characteristic recited in claim 21, wherein, for a future time period, a future value of a signal produced by the sensors is from measurements by each sensor.

23. The method for predicting the characteristic recited in claim 21, wherein, for the future period, a future value of a signal is produced by the measurements from all of the sensors.

24. The method for predicting a characteristic as claimed in claim 1, wherein the prediction model is determined by using a spectrum of the incident water swell.

25. A method for controlling a wave-energy converter using the method of claim 1, comprising converting energy from the incident water swell into electrical, pneumatic or hydraulic energy, in which the converted energy is dependent on the incident swells.

* * * * *